United States Patent [19]

Diffie et al.

[11] Patent Number: 5,371,794
[45] Date of Patent: Dec. 6, 1994

[54] METHOD AND APPARATUS FOR PRIVACY AND AUTHENTICATION IN WIRELESS NETWORKS

[75] Inventors: Whitfield Diffie, Mountain View; Ashar Aziz, Fremont, both of Calif.

[73] Assignee: Sun Microsystems, Inc., Mountain View, Calif.

[21] Appl. No.: 147,661

[22] Filed: Nov. 2, 1993

[51] Int. Cl.$^5$ .............................................. H04L 9/00
[52] U.S. Cl. ........................................ 380/21; 380/30
[58] Field of Search .................................... 380/21, 30

[56] References Cited

U.S. PATENT DOCUMENTS

| | | | |
|---|---|---|---|
| 4,200,770 | 4/1980 | Hellman et al. | 380/30 |
| 4,218,582 | 8/1980 | Hellman | 380/30 |
| 4,405,829 | 9/1983 | Rivest et al. | 380/30 |
| 4,424,414 | 1/1984 | Hellman et al. | 380/30 |
| 4,562,305 | 12/1985 | Gaffney | 380/21 |
| 4,650,975 | 3/1987 | Kitchener | 380/23 |
| 4,759,063 | 7/1988 | Chaum | 380/30 |
| 4,810,862 | 3/1989 | Nakamo | 380/21 |
| 4,825,050 | 4/1989 | Griffith et al. | 380/30 |
| 4,910,774 | 3/1990 | Barakat | 380/30 |
| 4,912,762 | 3/1990 | Lee et al. | 380/24 |
| 4,965,568 | 10/1990 | Atalla | 380/23 |
| 4,995,082 | 2/1991 | Schnorr | 380/30 |
| 5,005,200 | 4/1991 | Fischer | 380/30 |
| 5,016,274 | 5/1991 | Micali | 380/30 |
| 5,068,894 | 11/1991 | Hoppe | 380/23 |
| 5,109,152 | 4/1992 | Takagi | 380/28 |
| 5,120,939 | 6/1992 | Claus et al. | |
| 5,142,578 | 8/1992 | Matyas et al. | 380/21 |
| 5,204,901 | 4/1993 | Hershey et al. | 380/21 |
| 5,228,084 | 7/1993 | Johnson et al. | 380/23 |
| 5,247,578 | 9/1993 | Pailles et al. | 380/24 |
| 5,261,002 | 11/1993 | Perlman et al. | 380/30 |
| 5,299,262 | 3/1994 | Brickell et al. | 380/30 |

OTHER PUBLICATIONS

Authentication and Authenticated Key Exchanges, Authors: Diffie, Oorschot & Weiner, Published by Designs, Codes & Cryptography 2, 107–125, ©1992 Kluwer Academic Publishers.

The First Ten Years Of Public Key Cryptography, Author: Whitfield Diffie, Reprinted from Proceedings of the IEEE, vol. 76, No. 5, May 1988.

Overview of Cryptology: Summary Of Internet Cryptology Frequently Asked Questions (Oct. 1992).

The Keys To Privacy and Authentication, Publication by RSA Data Security, Inc., 100 Marine Parkway, Redwood City, Calif. 94065. (Oct. 1993).

Answers To Frequently Asked Questions About Today's Cryptography, Author: Paul Fahn, RSA Laboratories, 100 Marine Parkway, Redwood City, Calif. 94065 (Sep. 1992).

*Primary Examiner*—Salvatore Cangialosi
*Attorney, Agent, or Firm*—Blakely Sokoloff Taylor & Zafman

[57] ABSTRACT

A method and apparatus is disclosed for providing a secure wireless communication link between a mobile nomadic device and a base computing unit. A mobile sends a host certificate (Cert_Mobile) to the base along with a randomly chosen challenge value (CH1) and a list of supported shared key algorithms ("SKCS"). The base determines if the Cert_Mobile is valid. If the Cert_Mobile is not valid, then the base unit rejects the connection attempt. The base then sends a Cert_Base, random number (RN1) encrypted in mobile's public key and an identifier for the chosen SKCS to the mobile. The base saves the RN1 value and adds the CH1 value and the chosen SKCS to messages sent to the base. The mobile unit then validates the Cert_Base, and if the certificate is valid, the mobile verifies under the public key of the base (Pub_Base) the signature on the message. The signature is verified by taking the base message and appending it to CH1 and the list of shared key algorithms that the mobile provided in the first message. If the base signature is not valid, then the communication attempt is aborted. In the event that the base signature is valid, the mobile determines the value of RN1 by decrypting Pub_Mobile, RN1 under the private key of the mobile. The mobile then generates RN2 and the session key, and encrypts RN2 under the Pub_Base. The mobile sends the encrypted RN2 and E(Pub_Mobile, RN1) to the base. The base then verifies the mobile signature using the Pub_Mobile obtained from the Cert_Mobile. If the mobile signature is verified, the base decrypts E(Pub_Base, RN2) using its private key. The base then determines the session key. The mobile and base may then enter a data transfer phase using encrypted data which is decrypted using the session key which is RN1 ⊕ RN2.

32 Claims, 6 Drawing Sheets

METHOD AND APPARATUS FOR PRIVACY AND AUTHENTICATION IN WIRELESS NETWORKS

BACKGROUND OF THE INVENTION

1. Field of the Invention

The present invention relates to methods and apparatus for providing privacy and authentication in a wireless network. More particularly, the present invention provides a system using both public key and shared key encryption techniques for communications between wireless mobile devices and a base station.

2. Art Background

The advent of portable personal computers and workstations has expanded the concept of networks to include mobile devices. These mobile devices may be moved between global networks as well as within local networks. For example, a user of a portable notebook computing device may physically carry his computer from Palo Alto, California to Bangkok, Thailand. If the computer must interact and communicate with other computers coupled to a network, issues of network security naturally arise. In particular, if the user's computer communicates over a wireless link, for example with a local base station or through a direct satellite link from Bangkok to the United States, wireless security, privacy and authentication becomes important. The wireless medium introduces new opportunities for allowing eavesdropping of wireless data communications. Anyone with the appropriate type of wireless receiver may eavesdrop, and this kind of eavesdropping is virtually undetectable. Furthermore, since the wireless medium cannot be contained by the usual physical constraints of walls and doors, active intrusions through the wireless medium are also easier to accomplish.

As will be described, the present invention provides a method and apparatus for preventing the opportunity for unauthorized access to the network, and a secure communication protocol that provides for both privacy of the wireless data communications, as well as authenticity of the communicating parties.

SUMMARY OF THE INVENTION

The present invention provides method and apparatus for providing a secure communication link between a mobile wireless data processing device and a base (fixed node) data processing device which is coupled to a network. The mobile sends a host certificate (CERT_Mobile) to the base along with a randomly chosen challenge value (CH1) and a list of supported shared key algorithms ("SKCS"). The base verifies the certificate which is digitally signed by a trusted certification authority (CA). If the CERT_Mobile is not valid, then the base unit rejects the connection attempt. The base then sends a CERT_BASE, random number (RN1) and an identifier for the chosen SKCS to the mobile. The base saves the RN1 value and adds the CH1 value and the chosen SKCS to messages sent to the base by the mobile. The base then signs this message and sends it to the mobile. The mobile unit then validates the CERT_BASE, and if the certificate is valid, the mobile verifies under the public key of the base (Pub_BASE) the signature on the message. The signature is verified by taking the base message and appending it to CH1 and the list of shared key algorithms (SKCS) that the mobile provided in the first message. If the base signature is not valid, then the communication attempt is aborted. In the event that the base signature is valid, the mobile determines the value of RN1 by decrypting E(Pub_Mobile, RN1) under the private key of the mobile. The mobile then generates RN2 and the session key (RN1O RN2), and encrypts RN2 under the Pub_Base. The mobile sends the encrypted RN2 and E(Pub_Mobile, RN1) to the base in a message signed with mobile's private key. The base then verifies the mobile signature using the Pub_Mobile obtained from the CERT_Mobile. If the mobile signature is verified, the base decrypts E(Pub_Base, RN2) using its private key. The base then determines the session key (RN1$\oplus$RN2). The mobile and base may then enter a data transfer phase using encrypted data which is decrypted using the session key. The present invention further provides a method for changing the session key during a session, and the ability to use multiple certificates of authentication (CA) in the case of large networks.

NOTATION AND NOMENCLATURE

The detailed descriptions which follow are presented largely in terms of symbolic representations of operations of data processing devices coupled to a network. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind, however, that all of these similar terms are to be associated with the appropriate physical quantities and are merely convenient labels applied to these quantities.

In the present invention, the operations referred to are machine operations. Useful machines for performing the operations of the present invention include general purpose digital computers, or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION.

In the following description, numerous specific details are set forth such as system configurations, representative messages, wireless devices and base stations, etc., to provide a thorough understanding of the present invention. However, it will be apparent to one skilled in the art that the present invention may be practiced without these specific details. In other instances, well known circuits and structures are not described in detail in order to not obscure the present invention. Moreover, certain terms such as "knows", "verifies", "examines", "finds", "determines", "challenges", "authenticates", etc., are used in this Specification and are considered to be terms of art. The use of these terms, which to a casual reader may be considered personifications of computer or electronic systems, refers to the functions of the system as having human like attributes, for simplicity. For example, a reference herein to an electronic system as "determining"something is simply a shorthand method of describing that the electronic system has been programmed or otherwise modified in accordance with the teachings herein. The reader is cautioned not to confuse the functions described with everyday human attributes. These functions are machine functions in every sense.

EXEMPLARY HARDWARE

Figure 1:
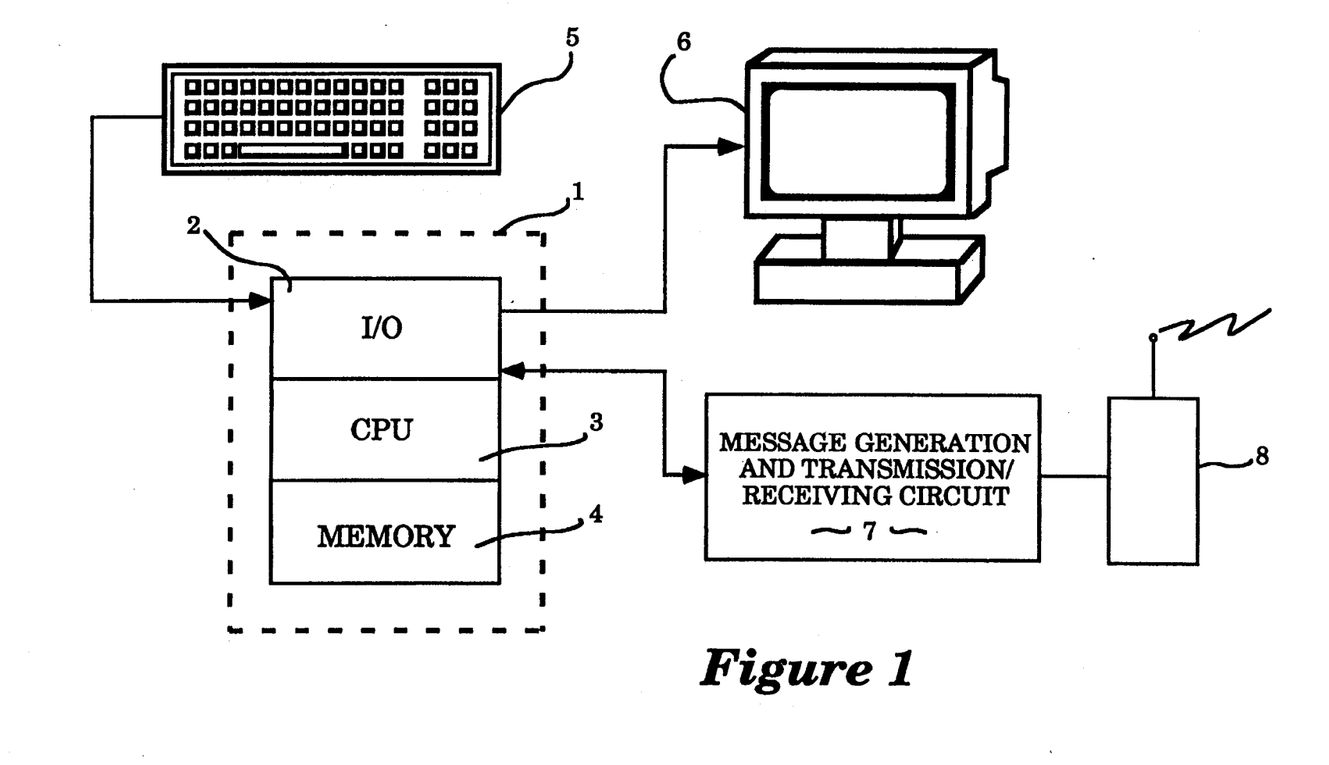
FIG. 1 illustrates a data processing system incorporating the teachings of the present invention.

FIG. 1 illustrates a data processing system in accordance with the teachings of the present invention. Shown is a computer 1 which comprises three major components. The first of these is an input/output (I/O) circuit 2 which is used to communicate information in appropriately structured form to and from other portions of the computer 1. In addition, computer 1 includes a central processing (CPU) 3 coupled to the I/O circuit 2 and a memory 4. These elements are those typically found in most general purpose computers and, in fact, computer 1 is intended to be representative of a broad category of data processing devices. Also shown in FIG. 1 is a keyboard 5 to input data and commands into computer 1, as is well known. A message generation and transmission/receiving circuit 7 is also coupled to the computer 1 through I/O circuit 2, to permit the computer 1 to communicate with other data processing devices. For example, in FIG. 1, the computer 1 is a nomadic device which communicates with other data processing devices using a wireless transmitter 8, as shown. However, it will be appreciated that the computer 1 may also be directly coupled to a network, in accordance with the teachings herein. A raster display monitor 6 is shown coupled to the I/O circuit 2 and is used to display images generated by CPU 3 in accordance with the present invention. Any well known variety of cathode ray tube (CRT) or other type of display may be utilized as display 6.

INVENTION OBJECTIVES

The design goals of the protocol of the present invention presented herein, and its placement in the protocol stack of a wireless mobile device and a base station, are driven by a number of requirements. A major requirement is that the placement of the security function of the present invention in the protocol stack be a seamless integration into existing wired networks. A very large number of network applications operate in the existing wired network world. The applications typically assume some level of security in the network. This security is, in some sense, provided by the physical security of wired networks. Unfortunately, since a wireless medium has no physical protection, introducing a wireless network negates any inherent protection which a physical network provides. In the interest of allowing the existing software application base to function at least as securely as it did over a wired network, the present invention secures the wireless link itself.

Two other alternatives, end-to-end security at the application layer and end-to-end security at the transport layer, are considered inadequate, given the requirement for seamless integration into the existing wired networks. An implication of seamless integration is that the very large number of existing nodes in a wired network should not be modified. Stipulating either of application or transport layer based end-to-end security would require modifying the software base of the entire fixed node network, should the mobile portable computing device need to have the same level of network access as any node on the wired network.

Figure 2:
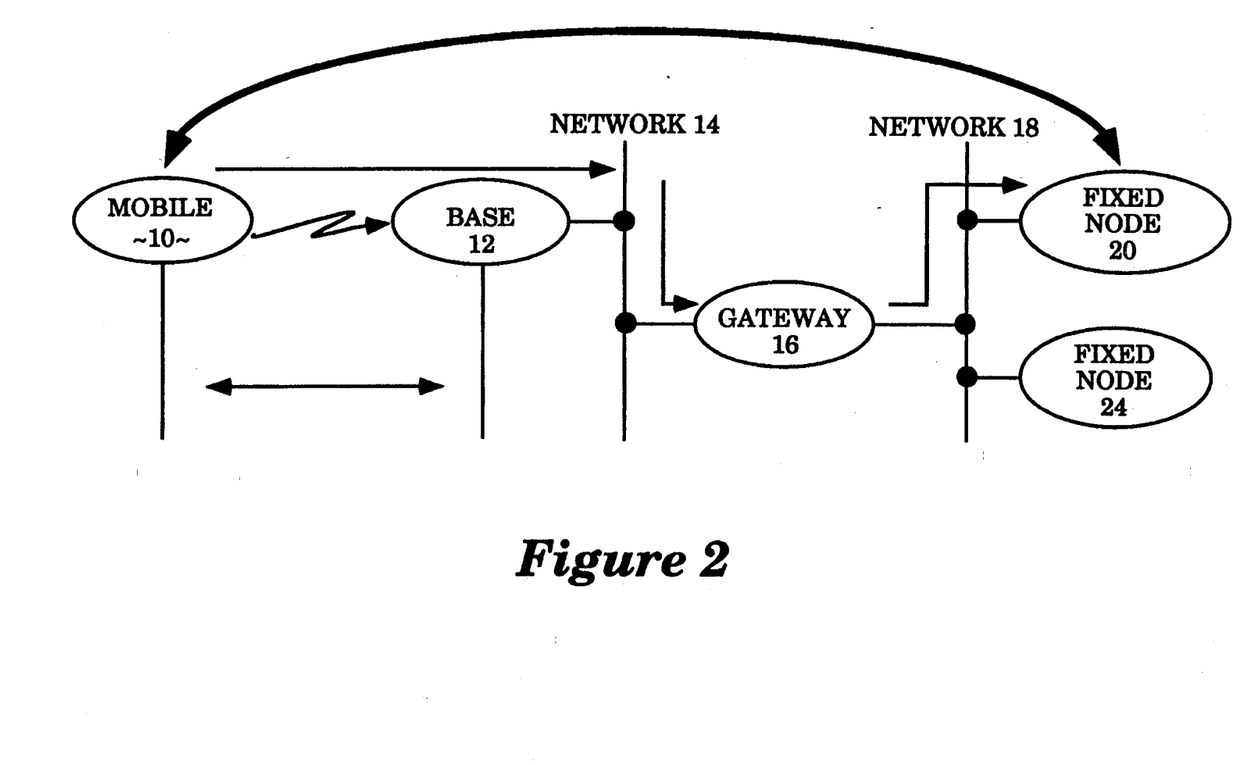
FIG. 2 diagrammatically illustrates the difference between link security and end to end security in a multiple network system incorporating the use of mobile wireless nodes.

For purposes of background, the difference between link security and end-to-end security is illustrated in FIG. 2. A mobile computer 10 is in wireless communication with a base unit 12. The mobile 10 and base unit 12 comprise a computer system such as that illustrated in FIG. 1. The base unit 12 is a fixed node of a network 14. A gateway 16 is provided to permit communication between the network 14 and a second network 18, as shown Fixed node data processing devices 20 and 24 are coupled to the network 18. A link level security approach requires that the wireless link between the mobile 10 and base 12 be secure. Existing security mechanisms for networks 14 and 18, as well as the gateway 16 need not be affected by the addition of the secure wireless link. In an end to end security mechanism, the mobile 10 communicates directly with a fixed node (for example, fixed node 20), thereby requiring that all of the software for each fixed and mobile node in networks 14 and 18 be upgraded to be compatible and achieve the same level of network security.

In an operational environment where it is considered feasible to upgrade all nodes in the network to be compatible with end-to-end security mechanisms, link security may in fact not be necessary. This is clearly not possible in very large corporate networks, or large multi-organizational networks like the Internet. The link-level security approach adopted in the design illustrated in FIG. 2 obviates the need for upgrading the software in the existing wired network. The wireless link itself is secured, and thus the security of the overall network, wired plus wireless, is no less than the security of the wired network alone.

It will be appreciated that the link level security approach does not rule out end-to-end security mechanisms. Such mechanisms can coexist with link-level security, by running an additional secure protocol on top of the link protocol. Security at multiple locations in the protocol stack is not necessarily considered harmful. The approach shown in FIG. 2 does not put the burden of providing end-to-end security at the time the wireless networks are deployed, but rather when it makes economical sense to secure the entire network by end-to-end mechanisms.

Figure 3:
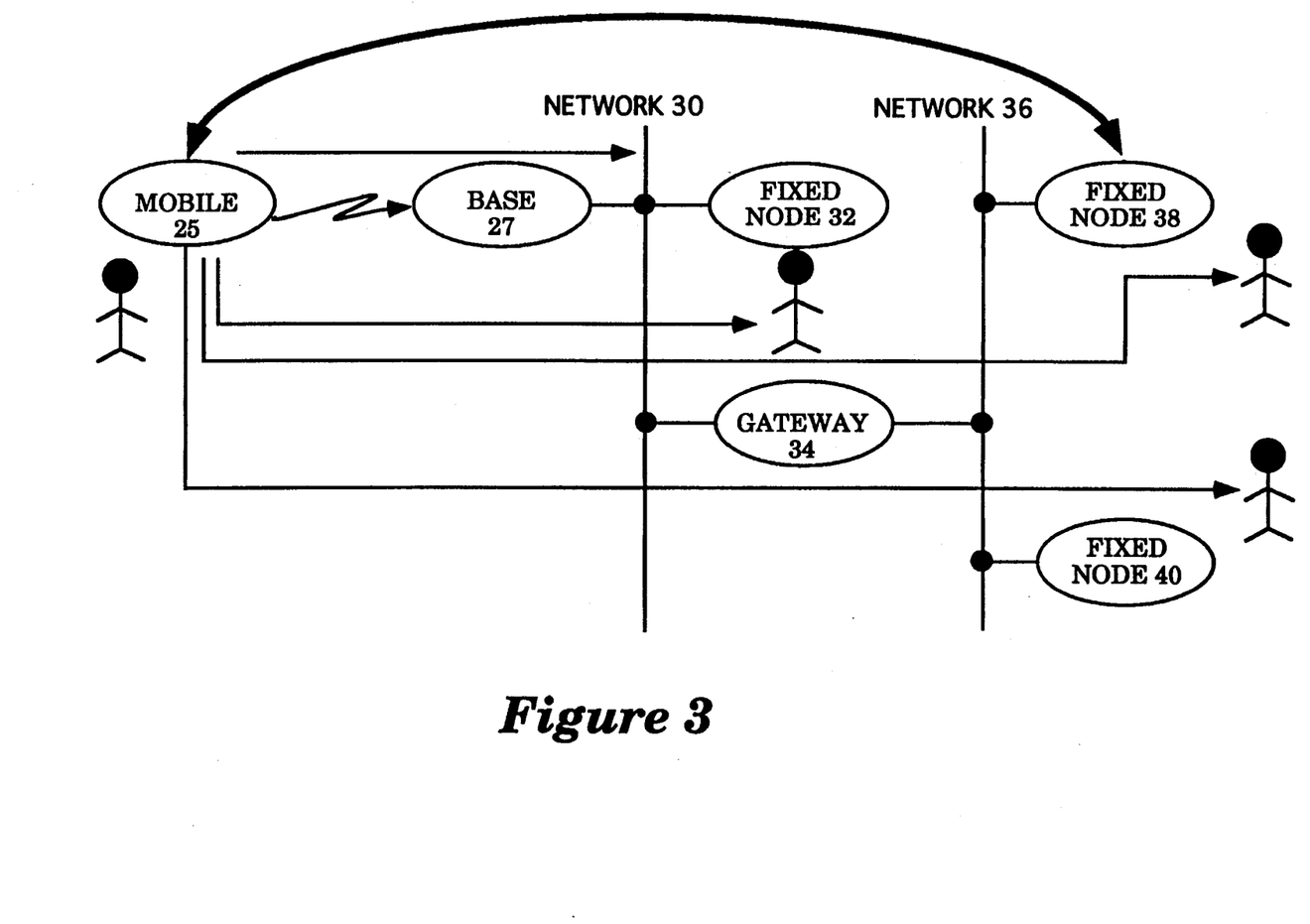
FIG. 3 diagrammatically illustrates a mobile user communicating with several users coupled to multiple networks.

The link layer involves communication between at least two machines, for example between mobile 10, base 12, and fixed node 20. The concept of users at the link layer is not truly appropriate, since multiple users are typically multiplexed on a single link layer. For example, a mobile user may be communicating with several users over the wireless link at the same time. All of these "conversations" are multiplexed on top of the same link layer. The link layer itself is only one hop of many, in a typical wireless plus wired network. (This situation is illustrated in FIG. 3). As shown in FIG. 2, a mobile unit 25 is in wireless communication with a base 27 coupled to a network 30. The base 27 is one of many fixed nodes (for example, fixed node 32) coupled to the network 30. A gateway device 34 coupled between the network 30 and a network 36 permits communication between nodes coupled to the respective networks. For example, a fixed node 38 coupled to network 36 may communicate over the gateway 34 to fixed node 32, or through the base 27 to the mobile 25.

Since end-to-end mechanisms are not stipulated, user authentication is thereby ruled out. What is left therefore is node-to-node (or machine-to-machine) authentication, since those are the entities primarily communicating over the wireless link. Machine-to-machine authentication is conceptually appropriate for a security protocol at the link layer.

Another design goal in the system of the present invention is that authentication includes mutual authentication. Namely, it is desirable that both ends of the wireless link (the mobile 25 and the base 25) to be able to authenticate each other. Only authorized nomadic computing devices will have access to network resources. Authenticating the base 25 is also necessary, if one considers the situation of competitors located in the same industrial park. The base stations of one competitor should not be able to masquerade as belonging to the other competitor. Mutual authentication serves this goal and is provided by the present invention as described below.

Another goal of the invention is to have flexibility in terms of being able to take advantage of future advances in shared-key cryptography. There is a need to allow interoperability between all versions of a secure wireless product.

Overview of the Present Invention

The present invention uses both public key (See W. Diffie and M. Hellman, "New Directions in Cryptography", IEEE Transactions on Information Theory, IT-22:644-645, 1976) and shared key cryptographic techniques to achieve privacy and authenticity. Public key cryptography is used to do session key setup and authentication. Shared key cryptography is used to provide privacy aspects of the protocol of the present invention.

Each participant node in the protocol of the present invention generates a public key/private key pair. The private key is kept securely by the owner of the key pair. The public key is submitted over a secure channel to a trusted Certification Authority (CA). The CA examines the relevant information to ascertain that the public key is indeed being presented by someone whose identity is known and who can be "trusted". Having submitted the public key, the person submitting is assumed to be in a position to obtain credentials on behalf of the machine whose public key is being certified. The CA will then issue a certificate to the person (who is acting on behalf of the machine). The certificate will contain a binding between the public key and a logical identifier of the machine (such as a machine name), in the form of a document digitally signed using the CA's private key.

Having obtained a certificate for each machine, as well as secure backup of the private keys, the mobile and base are in a position to engage in a secure protocol. The two parties exchange certificates and engage in a mutual challenge-response protocol. The protocol allows negotiation of the shared key algorithm. This allows for enhancing the protocol in the future to better shared key cryptosystems and also allows for interoperability between US and non-US versions of the product, should they require different encryption algorithms for exportability purposes.

The protocol also provides for good forward secrecy. If the private components of the public-private key pair of either the base or the mobile should be compromised at some future point in time, then this compromise does not necessarily compromise the wireless link data that has been exchanged by a machine whose private key has been compromised. This protocol requires compromise of both the base and the mobile's private key to compromise communication between the base and mobile. This is considered a less likely event than the compromise of either one of the keys.

In accordance with the teachings of the present invention, no assumptions are made about any of the key lengths, which can be lengthened or shortened for the environment and time frame.

DEFINITIONS

For purposes of this Specification, the following terms, negotiations and abbreviations shall have the following meaning:

E(X,Y) should read as encryption of Y under key X.
MD(X) should read as the Message Digest function value on contents X.
Public Key of Certification Authority = Pub_CA
Private Key of Certification Authority = Priv_CA
Public Key of Mobile Host = Pub_Mobile
Private Key of Mobile Host = Priv_Mobile
Public Key of Base Station = Pub_Base
Private Key of Base Station = Priv_Base
Certificate of Mobile Host = Cert_Mobile
Certificate of Base Station = Cert_Base
Sig(X,Y) should read as signature of Y with key X where Sig(X,Y) = E(X,MD(Y))
Signed(X,Y) represents the resulting signed message {Y, Sig(X,Y)}

SECURE PROTOCOL OF THE PRESENT INVENTION

Figure 4A:
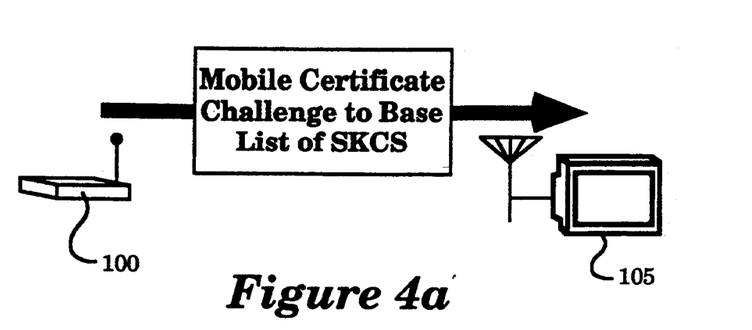
FIGS. 4a, 4b and 4c conceptually illustrate the sequence of steps executed by the mobile and base to establish a secure link in accordance with the teachings of the present invention.
Figure 4B:
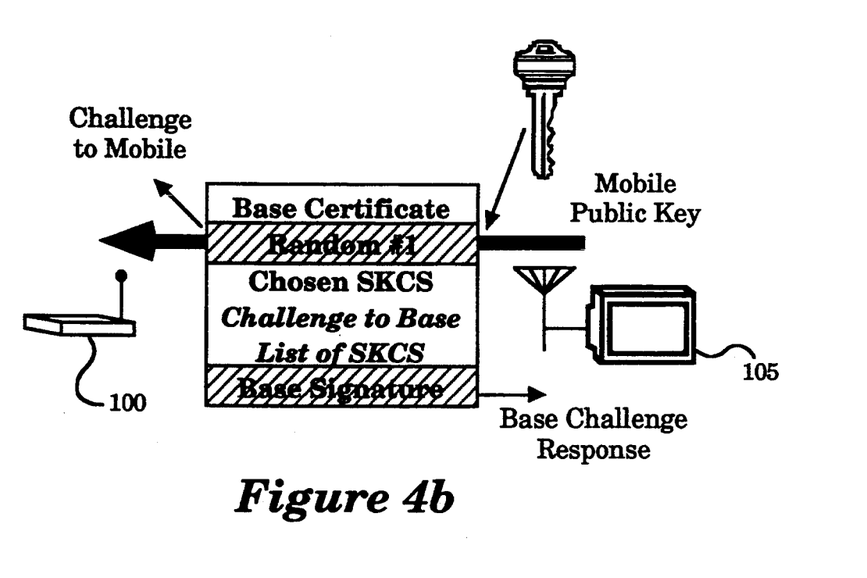
Figure 4C:
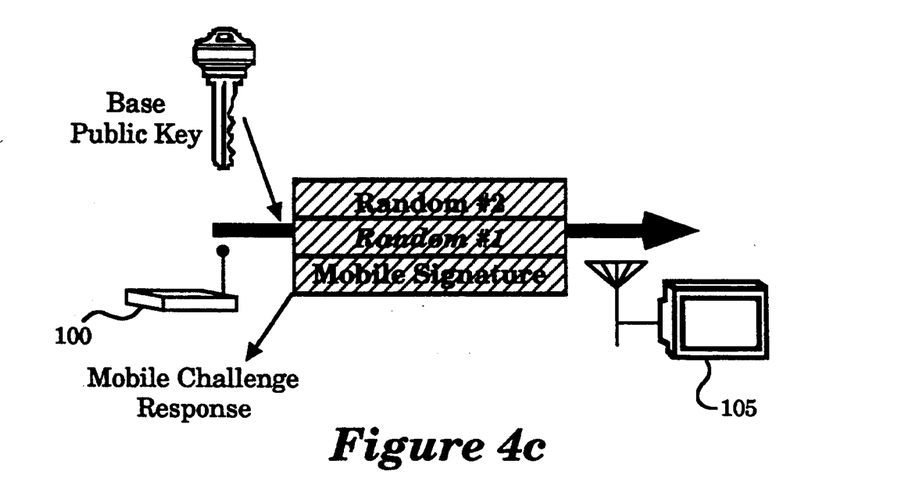
Figure 5A:
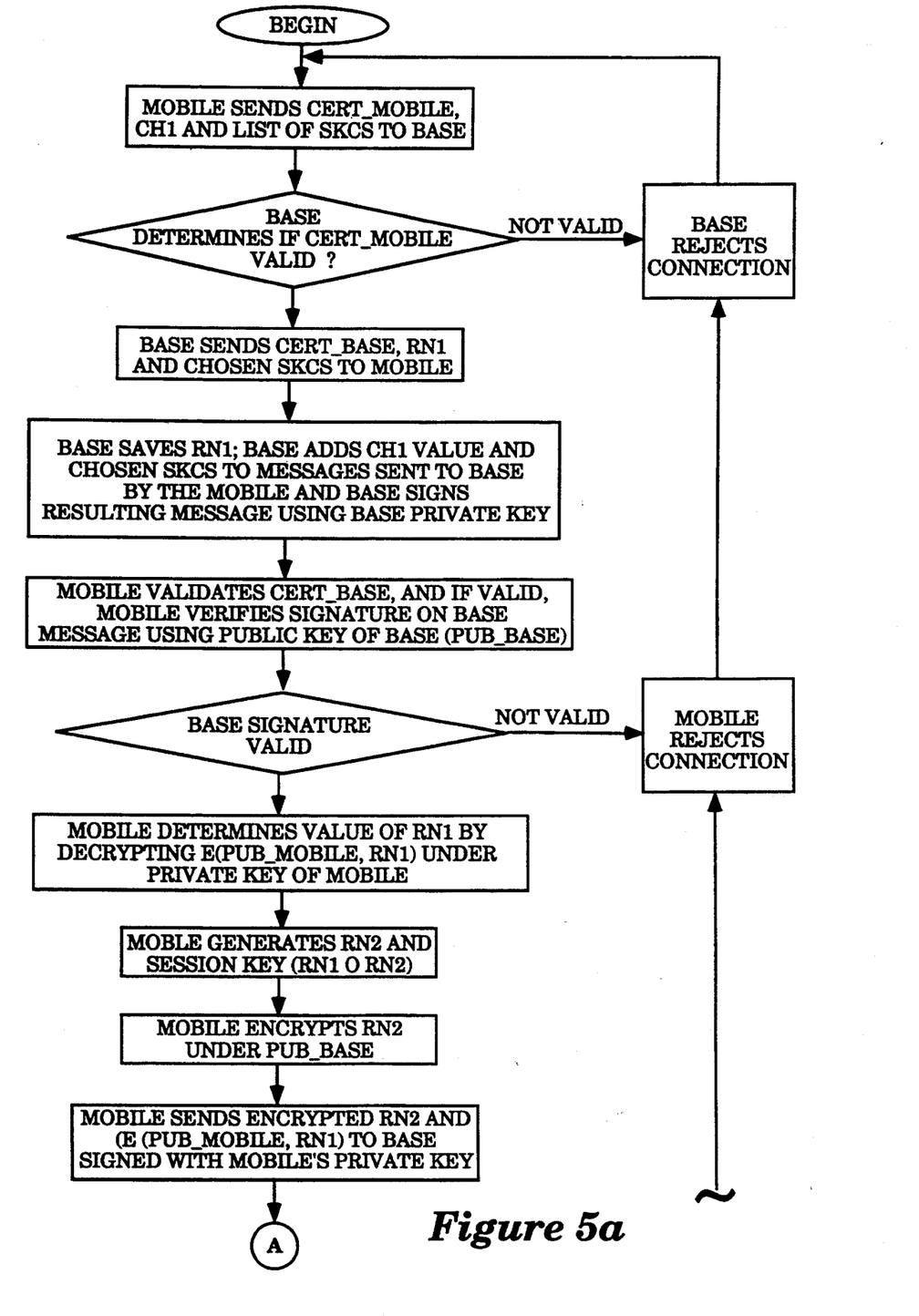
FIGS. 5a and 5b illustrate a flowchart of the steps executed by the mobile and base conceptually shown in FIGS. 4a–4c.
Figure 5B:
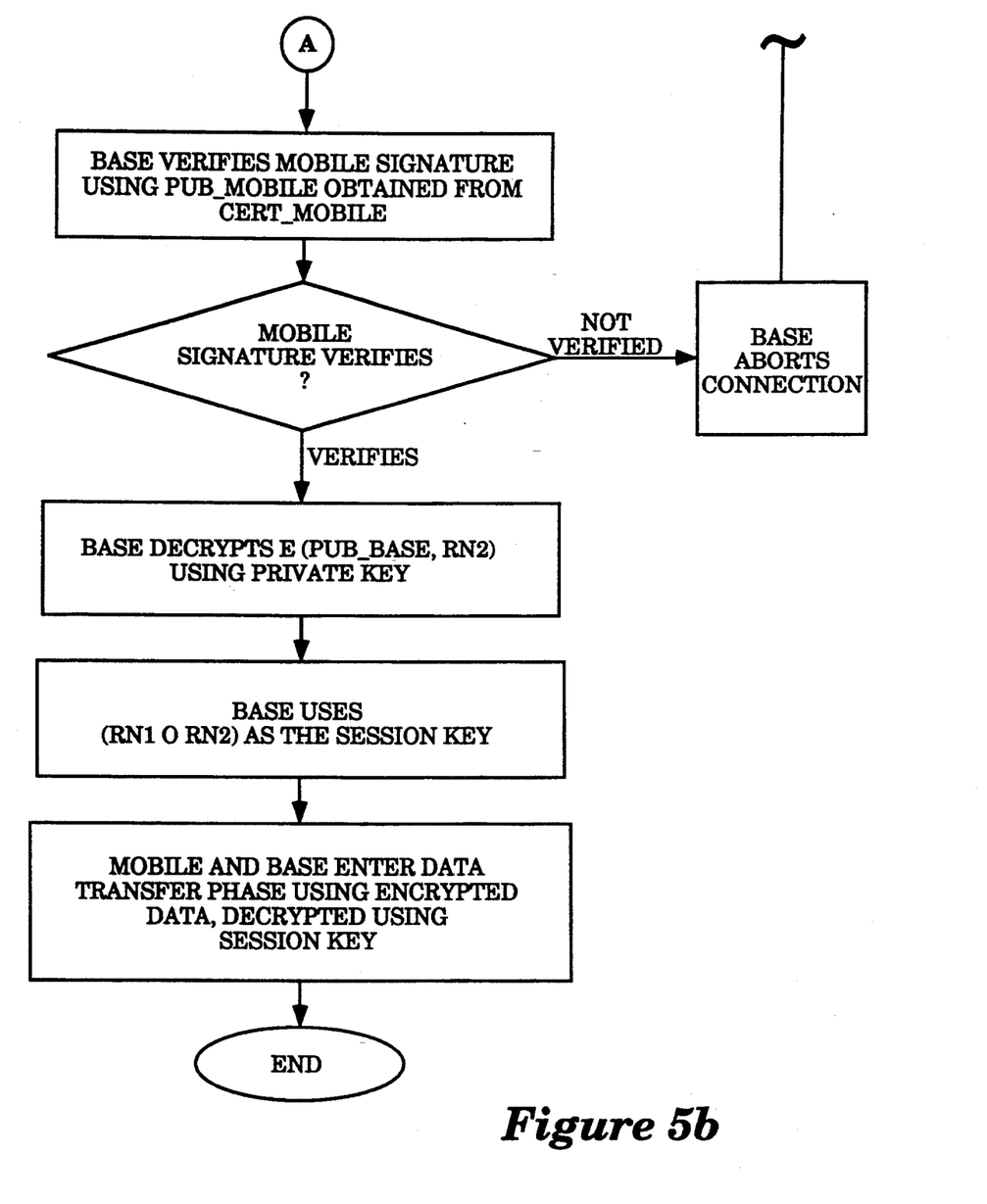

Referring now to FIGS. 4a–4c and the flowchart of FIGS. 5a and 5b, at connection initiation time, a mobile 100, requesting to connect to a wired network, sends its Host Certificate (Cert_Mobile) to a base 105, a 128-bit randomly chosen challenge value (CH1) and a list of supported shared key algorithms ("SKCS").

The list of supported shared key algorithms is intended to allow for negotiation of shared key algorithms (e.g. FEAL-32, DES, IDEA, etc.) with the base 105. The shared key algorithm will be used to encrypt subsequent data packets. Negotiation of shared key algorithms can allow for interoperability between say, domestic and foreign versions of the privacy modules.

A Certificate contains the following information:
{Serial Number, Validity Period, Machine Name, Machine Public Key, CA name}
Certificate = Signed(Priv_CA, Certificate contents)

The certificate format and encoding is chosen to be the same as the certificate format defined in CCITT X.509 (See CCITT Recommendation X.509 (1988), "The Directory- Authentication Framework"), and Privacy Enhanced Mail (PEM) (See S. Kent, "Privacy Enhancement for Internet Electronic Mail: Part II Certificate-Based Key Management", RFC 1422, BBN, February 1993; B. Kaliski, "Privacy Enhancement for Internet Electronic Mail: Part IV: Key Certification and Related Services", RFC 1424, BBN, February 1993). ! This allows the mobile 100 and the base 105 station to leverage from the same certificate infrastructure required by X.500 and PEM.

A Message Digest (MD) function is computed on the host certificate (Cert_Mobile) contents and is digitally signed by a trusted Certification Authority (CA). The "signing" is accomplished by encrypting the MD (a non-invertible hash function in the certificate contents) under the private key of the CA. This authenticates the contents of the certificate (Cert_Mobile), but does not make the contents private. For details on the topic of certificate based key-management and certificate issuing, the reader is referred to RFCs 1422 and 1424 (See S. Kent, "Privacy Enhancement for Internet Electronic Mail: Part II Certificate-Based Key Management", RFC 1422, BBN, February 1993; B. Kaliski, "Privacy Enhancement for Internet Electronic Mail: Part IV: Key Certification and Related Services", RFC 1424, BBN, February 1993) and CCITT standard X.509.

The first message from the mobile 100 to the base 105 requesting to join the wired network contains the information as shown below;
Message #1. Mobile-43 Base
{Cert_Mobile, CH1, List of SKCSs}

CH1 is a randomly generated 128-bit number. The list of shared key algorithms includes both an algorithm identifier and a key size.

The base 105, upon receipt of this request to join message, will attempt to validate Cert_Mobile. This is done by independently computing the MD on the contents of Cert_Mobile and comparing this with the decryption under the public key of the CA of the "signed" MD. If these two values match, then the certificate is a valid one, although at this point the base 105 does not know whether the mobile 100 also possesses the Private Key (Priv_Mobile) associated with the Public Key presented in the certificate Cert_Mobile.

If the certificate is invalid, the base 105 rejects the connection attempt. If the certificate verifies, the base 105 will reply with its Certificate, a random number RN1 encrypted under the public key of the mobile 100 and the Shared Key CryptoSystem (SKCS) that the base 105 chose out of the list presented by the mobile 100. The base 105 will save RN1 internally for later use. For purposes of computing the message signature, the base 105 will add both the challenge value CH1 and the list of shared key cryptosystems to the messages that it sends out.

The SKCS is chosen from the intersection of the set of shared key algorithms proposed in message #1 by the mobile 100 and the set that the base 105 supports. The base 105 chooses the SKCS algorithm it deems the most secure from the intersection of the two sets. The key size is always negotiated downwards to the minimum of what the mobile 100 proposes and what the base 105 can support for the chosen algorithm.

Message #2. Base→Mobile
{Cert_Base, E(Pub_Mobile, RN1), Chosen SKCS, Sig(Priv_Base, {E(Pub_Mobile, RN1), Chosen SKCS, CH1, List of SKCSs)}

Continuing to refer to FIG. 3, the chosen SKCS identifies both the chosen algorithm and the associated key size. The signature that is appended to the message is different from the normal signing of a message, as it includes something that is not part of the body of the message, but rather something implicit in the protocol.

The mobile 100 first validates the Certificate of the base 105 (Cert_Base), using CA's public key and the digital signature verification procedure described above. If the Certificate is valid, then the mobile 100 will verify under the public key of the base 105 (Pub_Base) the signature on the message.

The signature is verified by taking the base's message and appending to it CH1 and the list of shared key algorithms that the mobile 100 sent in the first message. The inclusion of the list for the purposes of signature verification allows message #1 to be sent unsigned. If an attacker wants to weaken the list of shared key algorithms, by jamming the original message and interjecting his own list, then this will be detected by the mobile 100 on receipt of the second message. If the signature matches, then the base 105 is deemed to be authentic. Otherwise, the base 105 is deemed an impostor or the original message is suspected of being tampered with and the mobile 100 will abort the connection attempt.

The value RN1 is obtained by the mobile by decrypting E(Pub_Mobile, RN1) under the private key of the Mobile 100. The Mobile 100 then generates another random number RN2 and will use the value (RN1 $\oplus$ RN2) as the session key.

To complete the authentication phase and to communicate the second half of the key RN2 to the base 105, the mobile 100 will encrypt under Pub_Base the value RN2 and send this in a message, including the original encrypted RN1 value it obtained in message #2. The inclusion of E(Pub_Mobile, RN1) in the third message serves to authenticate the Mobile 100, because a signature is computed on it, using the mobile's private key.

Message #3. Mobile→Base
{E(Pub_Base, RN2), Sig{Priv_Mobile, {E(Pub_Base, RN2), E(Pub_Mobile, RN1)}}}

As shown in FIGS. 4a–c and 5a–5b, the base 105 verifies the signature of the message using Pub_Mobile obtained from Cert_Mobile in message #1. If the signature verifies, then the mobile 100 is deemed an authentic host, otherwise the mobile 100 is deemed an intruder and the base 105 will reject the connection attempt.

Prior to entering the data transfer phase, the base 105 will decrypt E(Pub_Base, RN2) using its own private key. It will also then use (RN1$\oplus$RN2) as the session key. The reason that two random values are used for the key (as opposed to simply using RN1 for the key) is because this limits the damage that can occur if the private keys of one of the mobiles gets compromised. This approach requires the compromise of both the base 105 and the mobile's private keys, for preceding traffic between that base 105 and mobile 100 to be compromised.

Since both halves of the key are of equal length and completely random, knowing either one of RN1 or RN2 tells an attacker absolutely nothing about the session key (RN1 ⊕RN2). This is so because a one-time pad has been computed over each of RN1 and RN2 using the other as the one-time key.

If the connection attempt succeeds, mutual authentication has taken place and a session key has been obtained.

As illustrated, the message fields that are cross hatched in FIG. 3 are the parts that are encrypted using either a private key (for digital signature purposes) or a public key (to protect the session key components). Italics in the figure denote the fact that the italicized fields are only part of the signature block and not the message itself. The signature on message 2 serves three distinct purposes: i) to authenticate message #2 ii) to serve as a challenge response to message #1 and iii) to authenticate message #1 (by including the list of SKCSs in it). This has the result of minimizing the use of the public key cryptosystem, thereby optimizing the protocol to run on platforms with limited computational resources, yet the protocol of the present invention still provides strong security guarantees.

The computationally expensive portion of public key cryptosystems are typically the private key operations. Public key cryptosystems such as RSA (See RSA Data Security, Inc. PKCS #1–#10, June 1991) typically choose the keys so as to minimize the signature verification process and public key encryption process. Therefore, to assess the efficiency of the protocol, the total number of private key operations are counted. The mobile 100 performs two private key operations, the first one to decrypt RN1 and the second one to sign message #3. The base 105 also performs two private key operations, the first one to sign message #2 and the second one to decrypt RN2 from message #3. The total computationally expensive (private key) operations thus number only four in the present invention.

Using the teachings of the present invention, the key that is exchanged in the message key is really two different keys, one for each direction of data transfer. This prevents keystream reuse, in case the cipher is operating in an additive stream mode. The protocol encoding described at the end of this Specification identifies how the two keys for each direction are differentiated.

DATA PACKET

A primary issue for data packets is maintaining decryptability of data packets in the presence of packet losses. Data packets may get lost or arrive out of order, because of noise or reflections on the wireless link. In accordance with the present invention, the solutions depend on the shared key cipher and the mode its operating in. For additive stream ciphers, in order to stay "in sync" with the pseudo-random streams, on each side a 64-bit "message id" field will be sent in the clear at the beginning of each packet. This "message id" field will contain the total number of bytes that have been previously sent. This will allow correct operation with additive stream ciphers in the presence of undetected or corrupted or out-of-order wireless link packets.

For DES in cipher feedback mode or counter driven mode, the "message id" is the last 64 bits of cipher text of the last packet. For DES in output feedback mode, the "message id" is simply the count of the number of 64 bit blocks that have been sent. The length of the "message id" field and its meaning are implicit in the choice of the shared key algorithm and its operating mode.

Integrity checking of data packets is done by trailing each packet with a 32 bit check sum field, which is part of the packet data that gets encrypted. This will provide both integrity and privacy for the data packets, but no playback protection. Playback protection for data packets is not deemed to be important. It is likely that any playback attempt will be rejected by higher layer protocols like TCP/TP4, etc. Since playbacks are possible in the normal (benign) datagram environment, an attacker cannot hope to achieve malicious results by injecting playbacks of data packets.

KEY CHANGE PROTOCOL OF THE PRESENT INVENTION

A Change Key message exchange can be initiated by either the base or the mobile 100. Base 105 initiates the key change as follows:

1. Base 105→Mobile 100
   Signed(Priv_Base, {E(Pub_Mobile, New_RN1), E(Pub_Mobile, RN1)})
2. Mobile 100→Base 105
   Signed(Priv_Mobile, {E(Pub_Base, New_RN2), E(Pub_Base, RN2)})

If the Mobile 100 initiates the key change, the procedure is as follows:

1. Mobile 100→Base 105
   Signed(Priv_Mobile, {E(Pub_Base, New_RN2), E(Pub_Base, RN2)})
2. Base 105→Mobile 100
   Signed(Priv_Base, {E (Pub_Mobile, New_RN 1), E(Pub_Mobile RN1) })

The value (New_RN2⊕New_RN1) is used as the new key. The values RN1 and RN2 are always derived from the last key exchange, which may be from the initial connection setup or from the last key change message, whichever is more recent.

No matter which unit (base or mobile) initiates the key change, RN1 always refers to the portion of the key generated by the base 105 and RN2 always refers to the portion of the key generated by the mobile 100. A change key message will serve to reinitialize the SKCS.

Each side verifies the signatures on the messages and compares RN1 and RN2 with its internally stored values. If the signature does not verify or the RN1/RN2 values do not match with the internally stored ones, the key change message will be ignored. This will prevent key change messages from being played back, because the messages are sensitive to the history of the key change. If key change messages could be played back without detection, this could result in mismatched keys on the two legitimate ends, thus allowing a simple denial of service type of attack. Such an attack is precluded by the key change messages of the types described above.

The present invention prevents key change messages from being played back, without resort to sequence numbers. Sequence numbers can be tedious to operate with in protocol implementations, since the sequence numbers would need to be remembered across power downs and machine reboots.

OPERATION WITH MULTIPLE CAs

The present invention was described above in terms of a single network wide CA. For a large network, a single CA cannot service all the network nodes. In such cases, a hierarchy of CAs is employed. Such CA hierarchies are described in detail in CCITT X.509 and the PEM RFCs. When a CA hierarchy is employed, the protocol is modified as follows. Message #2 will not include only the certificate of the base 105 station. Instead, message #2 will send a certificate path, which will allow the mobile unit to verify the base certificate. The certificate path will be constructed by the base station to start from the CA that issued the mobile's certificate. Since the base is connected to the wired network, it has access to network databases (directory services) that allow the base to construct such a path. The mobile 100 cannot be configured to know all possible certificate paths and so it is required simply to send its own certificate. This allows the configuration of a mobile 100 to be simple, while still allowing the flexibility of allowing multiple CAs in the form of a CA hierarchy.

Another modification that is necessitated by the inclusion of multiple CAs is that a mobile 100 cannot be expected to have an up-to-date copy of Certificate Revocation List (CRL) for each CA in the certificate path. CRLs are necessary to accommodate the possibility that the private key corresponding to a certified public key may be compromised. In such an eventuality, that certificate needs to be hot-listed or revoked. A CRL is such a hot list, listing all the certificates that have been revoked by a CA. The base also has the responsibility of supplying the CRL for each CA in the certificate path. CRLs are described in detail in RFC 1422. The new message #2 is thus;

Message #2. Base 105→Mobile 100 {Cert_Path, List of CRLs, E(Pub_Mobile, RN1), Chosen SKCS, Sig(Priv_Base, {E(Pub_Mobile, RN1), Chosen SKCS, CH1, List of SKCSs})}

PROTOCOL ENCODING

In order to provide a detailed description of the encoding of the protocol, we specify the messages in ASN.1 (See, "CCITT Recommendation X.208 (1988), "Specification of Abstract Syntax Notation (ASN.1)"). The encoding is performed using the DER subset of the ASN.1 BER (CCITT Recommendation X.209 (1988), "Specification of Basic Encoding Rules for ASN.1)"), as specified in X.509 Section 8.7:

```
Message #1.
  Message - 1:: = SEQUENCE {
    mobileCert            Certificate,
    challengeToBase       OCTET STRING,
    listOfSKCS            SEQUENCE OF
                          AlgorithmIdentifier}
Message #2.
  Message - 2:: = SEQUENCE {
    baseCertpath          CertificationPath,
    litOfCRLs             SEQUENCE OF
                          CertificateRevocationList,
    baseToMobileRN1       OCTET STRING,
    mobileToBaseRN1       OCTET STRING,
    chosenSKCS            AlgorithmIdentifier,
    sigalg                AlgorithmIdentifier,
    message2sig           BIT STRING}
Message #3.
  Message - 3:: = SEQUENCE {
    baseToMobileRN2       OCTET STRING,
    mobile1ToBaseRN2      OCTET STRING,
    sigalg                AlgorithmIdentifier,
    message3sig           BIT STRING}
```

AlgorithmIdentifer, Certificate and Certification Path are specified in X.509. CertificateRevocationList is defined in RFC 1422. The signal fields of messages #2 and #3 identify the signature algorithm used to compute message2sig and message3sig respectively. This includes identification of both the hash algorithm and the public key cryptosystem. This is compatible in spirit with the SIGNED ASN.1 MACRO OF X.509, except that the signature is not computed over fields that are entirely contained in the messages themselves.

A set of standards from RSADSI, Inc., collectively known as Public Key Cryptography Standards (PKCS) (See RSA Data Security, Inc. PKCS #1–#10, June 1991), specify several digital signature and public key algorithms. Examples of these include MD2 with RSA encryption and the RSA public key cryptosystem. These may be employed for the certificate and protocol related digital signatures and public key encryptions.

PROOF OF THE PRESENT INVENTION PROTOCOL

The security of the protocol may be proved using the Logic of Authentication developed by Burrows, Abadi and Needham (See M. Burrows, M. Abadi, R. Needham, "A Logic Authentication", DEC SRC Research Report #39, Feb. 22, 1990). The formalism as described has limitations in describing serverless protocols, such as the present invention. The limitation has to do with accepting the validity of a public key certificate. All that can be logically derived from a certificate is that the CA once said "$K_a$ speaks for A". Nothing can be said about whether the CA still believes the certificate to be valid. In practice, this is handled by a Certificate Revocation List and validity periods on the certificate itself. This is a limitation because the only way of promoting once said to believes i the original formalism is by use of the freshness property of the statement. In a serverless protocol, such a freshness guarantee cannot be provided, because the server is not necessarily available at the time of communication.

Having noted this problem, the certificate is assumed to be fresh unless there is a statement to the contrary. To analyze the protocol, the idealized version of the protocol is first derived. To do this, we dispense with elements that have no place in the formalism. This includes all clear-text communication, as well as the negotiation of the shared key algorithm. First, the stripped down concrete protocol is provided, followed by its idealized version. (The same notation as used by Abadi, et al.) A is the mobile 100 and B is the base 105. CH1 is $N_a$.

Concrete Protocol:

Message 1: $A \longrightarrow B \ \left\{ \mid \xrightarrow{K_a} A \right\}_{K_{ca}^{-1}}, N_a$ Message 2: $B \longrightarrow A \quad \left(\left(\stackrel{K_b}{\longmapsto} B\right)_{K_{ca}^{-1}}, \{RN1\}_{K_a}, N_a\right)_{K_b^{-1}}$ Message 3: $A \longrightarrow B \quad \{\{RN2\}_{K_b}, \{RN1\}_{K_a}\}_{K_a^{-1}}$ Idealized Protocol:

Message 1: $A \longrightarrow B \quad \left(\stackrel{K_a}{\longmapsto} A\right)_{K_{ca}^{-1}}$ Message 2:

$$B \longrightarrow A \quad \left(\left(\stackrel{K_b}{\longmapsto} B\right)_{K_{ca}^{-1}}, \left(A \stackrel{RN1}{\longleftrightarrow} B\right), N_a\right)_{K_b^{-1}}$$

Message 3: $B \longrightarrow A \quad \left(\left(A \stackrel{RN2}{\longleftrightarrow} B\right), \{RN1\}_{K_b}\right)_{K_b^{-1}}$ Proof Assumptions:

a) $A \models \stackrel{K_a}{\longmapsto} A$ b) $A \models \stackrel{K_{ca}}{\longmapsto} CA$ c) $A \models \left(CA \Longrightarrow \stackrel{K}{\longmapsto} B\right)$ d) $A \models \#(N_a)$ e) $A \models A \stackrel{RN2}{\longleftrightarrow} B$ f) $B \models \stackrel{K_b}{\longmapsto} B$ g) $B \models \stackrel{K_{ca}}{\longmapsto} CA$ h) $B \models \left(CA \Longrightarrow \stackrel{K}{\longmapsto} A\right)$ i) $B \models \#(RN1)$ j) $B \models A \stackrel{RN1}{\longleftrightarrow} B$ k) $CA \models \stackrel{K_a}{\longmapsto} A$ l) $CA \models \stackrel{K_{ca}}{\longmapsto} CA$ m) $CA \models \stackrel{K_b}{\longmapsto} B$ n) $A \models \left(B \Longrightarrow A \stackrel{RN1}{\longleftrightarrow} B\right)$ o) $B \models \left(A \Longrightarrow A \stackrel{RN2}{\longleftrightarrow} B\right)$

PROOF

From message #2, assumptions b) and c), the message-meaning and jurisdiction rules and the assertion that Cert₁₃B is assumed fresh, we get, $$A \triangleleft \left\{\left(\stackrel{K_b}{\longmapsto} B\right)_{K_{ca}^{-1}}, \left(A \stackrel{RN1}{\longleftrightarrow} B\right), N_a\right\}_{K_b^{-1}}$$

$$A \models \stackrel{K_b}{\longmapsto} B$$

Applying the message-meaning rule, we get $$A \models B \hspace{2pt}\sim\hspace{-6pt}\mid \left\{\left(\stackrel{K_b}{\longmapsto}\right)_{K_{ca}^{-1}}, \left(A \stackrel{RN1}{\longleftrightarrow} B\right), N_a\right\}$$

From assumption d) and the nonce-verification rule $$A \models B \models \left(A \stackrel{RN1}{\longleftrightarrow} B\right)$$

Applying the jurisdiction rule and assumption n)

$$A \models \left(A \stackrel{RN1}{\longleftrightarrow} B\right) \quad \text{-Result 1}$$

From message #1, assumptions g) and h), the message-meaning and jurisdiction rules and the assertion that Cert_A is assumed fresh, we get $$B \models \stackrel{K_a}{\longmapsto} A$$

From message #3, we get $$B \triangleleft \left\{\left(A \stackrel{RN2}{\longleftrightarrow} B\right), \{RN1\}_{K_a}\right\}_{K_a^{-1}}$$

Applying the message-meaning rule we get $$B \models A \hspace{2pt}\sim\hspace{-6pt}\mid \left(\left(A \stackrel{RN2}{\longleftrightarrow} B\right), \{RN1\}_{K_a}\right)$$

Applying the nonce-verification rule and assumption i)

$$B \models A \models \left( A \overset{RN2}{\longleftrightarrow} B \right)$$

Applying the jurisdiction rule and assumption o)

$$B \models \left( A \overset{RN2}{\longleftrightarrow} B \right)$$

From Result −1 and the conclusion above, we summarize the following two results, $$A \models \left( A \overset{RN2}{\longleftrightarrow} B \right)$$

$$B \models \left( A \overset{RN1}{\longleftrightarrow} B \right)$$

It follows that since, $$K_{ab} = RN1 \oplus RN2$$

then from assumptions e) and j) and the two results above we get $$A \models A \overset{K_{ab}}{\longleftrightarrow} B$$

$$B \models A \overset{K_{ab}}{\longleftrightarrow} B$$

These are the goals of an authentication protocol. The Logic of Authentication formalism does not deal with issues such as forward secrecy, but this is an additional goal of the protocol of the present invention. Also, in the present invention, the use of synchronized clocks is avoided. Requiring synchronized clocks has many problems associated with it (See, W. Diffie, P.C.V. Oorschot, M. J. Wiener, "Authentication and Authenticated Key Exchanges", in "Designs, Codes and Cryptography", pages 107–125, Kluwer Academic Publishers, 1992). Using a challenge response mechanism avoids these problems. Assumption i) makes explicit the fact that part of the session key (RN1) is being used for authentication purposes, another desirable attribute of an authentication protocol.

Assumptions n) and o) are unusual in that each side expresses a belief in the authority of the other side to produce an acceptable key component. This is necessary in a serverless protocol, because one or both of the parties are responsible for generating the session key. This is a reflection of the unstated requirement in the protocol of competence on both sides to pick keys that have the appropriate properties of randomness and unpredictability.

CONCLUSION

Accordingly, a system and method for privacy and authentication for wireless networks is disclosed. While the present invention has been described in conjunction with a few specific embodiments identified in FIGS. 1-5b, it will be apparent to those skilled in the art that many alternatives, modifications and variations in light of the foregoing description are possible.

We claim:

1. An improved method for providing secure communications between. a first data processing device and a second data processing device, comprising the steps of:
   (a) said first data processing device transmitting a first message including: a Mobile Certificate (Cert_Mobile) including a mobile public key (Pub_Mobile), a chosen challenge value (CH1), and a list of supported shared key algorithms (SKCS), to said second data processing device;
   (b) said second data processing device receiving said first message and verifying a first signature of a first certificate authority (CA), said second data processing device validating said received Cert_Mobile, and if said Cert_Mobile is valid, said second data processing device transmitting a second message including: a Base Certificate (Cert_Base) including a base public key (Pub_Base), a second digital signature, a random number (RN1), and an identifier of one of said SKCS chosen from said list of supported shared key algorithms, to said first data processing device;
   (c) said first data processing device receiving said second message and validating said Cert_Base, and if said Cert_Base is valid, said first data processing device validating said second signature of said Cert_Base using said Pub_Base, such that if said second signature is valid, said first data processing device determining the value of RN1 by decrypting the value of E(Pub_Mobile, RN1) using a private key of said first data processing device (Priv_Mobile);
   (d) said first data processing device generating a value RN2 and a first session key having the value (RN1⊕RN2), said first data processing device encrypting the value of RN2 using said base public key (Pub_Base), and sending a third message to said second data processing device including said encrypted RN2 and the value of E(Pub_Mobile, RN1) along with a digital signature corresponding to said first data processing device;
   (e) said second data processing device receiving said third message and verifying said digital signature of said first data processing device using Pub_Mobile obtained from said Cert_Mobile, and if said signature of said first data processing device is verified, said second data processing device decrypting the value of E(Pub_Base, RN2) using a private key of said second data processing device (Priv_Base), said second data processing device using said first session key having the value of (RN1⊕RN2);
   (f) said first and second data processing devices transferring data using encrypted data which is decrypted using said first session key.

2. The method as defined by claim 1 wherein said Cert_Mobile comprises the expression:
   Signed(Priv_CA, Certificate contents).

3. The method as defined by claim 2 wherein said Certificate contents comprises:
   {Serial Number, Validity Period, Machine Name, Machine Public Key, CA name}.

4. The method as defined by claim 3 wherein said MD is signed by said CA by encrypting said MD under said private key of said CA, such that the content of said Cert_Mobile are authenticated.

5. The method as defined by claim 4 wherein said CH1 comprises a randomly generated number.

6. The method as defined by claim 5 wherein said step of validating said received Cert_Mobile of step (b) includes the steps of:
said second data processing device independently computing said MD function on the contents of Cert_Mobile;
said second data processing device comparing said independently computed MD function with the decryption under said public key of said CA of said MD signed by said CA in Step (b) of claim 1, such that if said MDs match said Cert_Mobile is valid.

7. The method as defined by claim 6 wherein said RN1 value is encrypted using said Pub_Mobile of said first data processing device.

8. The method as defined by claim 7 wherein said second data processing device stores said RN1 value, and includes said CH1 value and said identifier of said chosen SKCS in messages between said second and said first data processing devices.

9. The method as defined by claim 8 wherein said second message comprises the expression:
{Cert_Base, E(Pub_Mobile, RN1), Chosen SKCS, Sig(Priv_Base,{E(Pub_Mobile, RN1), Chosen SKCS, CH1, List of SKCSs})}.

10. The method as defined by claim 9 wherein said second digital signature is verified in Step (b) of claim 1 by appending said second message to CH1 and said list of SKCSs.

11. The method as defined by claim 10 wherein said value RN2 comprises a random number.

12. The method as defined by claim 11 wherein said third message comprises the expression:
{E(Pub_Base, RN2), Sig{Priv_Mobile, {E(-Pub_Base,RN2), E(Pub_Mobile, 13. The method as defined by claim 12 wherein said CH1 value comprises a 128 bit number.

14. The method as defined by claim 12 further including a key change method to define a New Key, comprising the steps of:
(a) said second data processing device sending a forth message comprising: Signed(Priv_Base, {E(-Pub_Mobile, New_RN1), E(Pub_Mobile, RN1)});
(b) said first data processing device receiving said forth message and send a fifth message to said second data processing device comprising: Signed(-Priv_Mobile, {E(Pub_Base, New_RN2), E(-Pub_Base, RN2)});
wherein the value of RN2⊕RN1 is used as the New Key.

15. The method as defined by claim 12 further including a key change method to define a New Key, comprising the steps of:
(a) said first data processing device sending a forth message to said second data processing device comprising the expression: Signed(Priv_Mobile, {E(Pub_Base, New_RN2), E(Pub_Base, RN2)});
(b) said second data processing device receiving said forth message and sending a fifth message to said first data processing device comprising the expression: Signed(Priv_Base, {E(Pub_Mobile, New_RN1), E(Pub_Mobile, RN1)});
wherein the value of RN2 ⊕RN1 is used as the New Key.

16. The method as defined by claim 1 further including a plurality of CAs, and wherein said second message is defined by the expression:
{Cert_Path, List of CRLs, E(Pub_Mobile, RN1), Chosen SKCS, Sig(Priv_Base, {E(Pub_Mobile, RN1), Chosen SKCS, CH1, List of SKCSs})}and wherein:
CRL comprises a certificate revocation list for each of said CAs.

17. In a network having a first data processing device in communication with a second data processing device, an apparatus for providing a secure data transfer between said first data processing device and said second data processing device, comprising:
a first message generation and transmission/receiving circuit coupled to said first data processing device for transmitting a first message including: a Mobile Certificate (Cert_Mobile) having a mobile public key (Pub_Mobile), a chosen challenge value (CH1), and a list of supported shared key algorithms (SKCS), to said second data processing device;
second message generation and transmission/receiving circuit coupled to said second data processing device for receiving said first message, said second data processing device validating said received Cert_Mobile, and if said Cert_Mobile is valid, said second data processing device transmitting a second message including: a Base Certificate (Cert_Base) including a base public key (Pub_Base), a second digital signature, a random number (RN1), and an identifier of one of said SKCS chosen from said list of supported shared key algorithms, to said first data processing device;
said first data processing device receiving said second message using said first message and transmission/-receiving means and validating said Cert_Base, and if said Cert_Base is valid, said first data processing device validating said second signature of said message using said Pub_Base, such that if said second signature is valid, said first data processing device determines the value of RN1 by decrypting the value of E(Pub_Mobile, RN1) using a private key of said first data processing device (Priv_Mobile);
said first data processing device generating a value RN2 and a first session key having the value (RN1⊕RN2), said first data processing device encrypting the value of RN2 using said base public key (Pub_Base), and sending a third message to said second data processing device including said encrypted RN2 and the value of E(Pub_Mobile, RN1) along with a digital signature corresponding to said first data processing device;
said second data processing device receiving said third message using said second message and transmission/receiving means and verifying said digital signature of said first data processing device using Pub_Mobile obtained from said Cert_Mobile, and if said signature of said first data processing device is verified, said second data processing device decrypting the value of E(Pub_Base, RN2) using a private key of said second data processing device (Priv_Base), said second data processing device using said first session key having the value of (RN1⊕RN2);

said first and second data processing devices transferring data using encrypted data which is decrypted using said first session key.

18. The apparatus as defined by claim 17 wherein said Cert_Mobile comprises the expression:
Signed(Priv_CA, Certificate contents).

19. The apparatus as defined by claim 18 wherein said Certificate contents comprises:
{Serial Number, Validity Period, Machine Name, Machine Public Key, CA name}.

20. The apparatus as defined by claim 19 wherein said MD is signed by said CA by encrypting said MD under said private key of said CA, such that the content of said Cert_Mobile are authenticated.

21. The apparatus as defined by claim 20 wherein said CH1 comprises a randomly generated number.

22. The apparatus as defined by claim 21 wherein said step of validating said received Cert_Mobile is determined by:
said second data processing device independently computing said MD function on the contents of Cert_Mobile;
said second data processing device comparing said independently computed MD function with the decryption under said public key of said CA of said MD signed by said CA, such that if said MDs match said Cert_Mobile is valid.

23. The apparatus as defined by claim 22 wherein said RN1 value is encrypted using said Pub_Mobile of said first data processing device.

24. The apparatus as defined by claim 23 wherein said second data processing device stores said RN1 value, and includes said CH1 value and said identifier of said chosen SKCS in messages between said second and said first data processing devices.

25. The apparatus as defined by claim 24 wherein said second message comprises the expression:
{Cert_Base, E(Pub_Mobile, RN1), Chosen SKCS, Sig(Priv_Base,{E(Pub_Mobile, RN1), Chosen SKCS, CH1, List of SKCSs))}.

26. The apparatus as defined by claim 25 wherein said second digital signature is verified by appending said second message to CH1 and said list SKCSs.

27. The apparatus as defined by claim 26 wherein said value RN2 comprises a random number.

28. The apparatus as defined by claim 27 wherein said third message comprises the expression:
{E(Pub_$_{Base}$, $_{RN}$2), Sig{Priv_Mobile, {E(Pub_Base,RN2), E(Pub_Mobile, 29. The apparatus as defined by claim 28 wherein said CH1 value comprises a 128 bit number.

30. The apparatus as defined by claim 29 wherein a New Key may be defined:
said second data processing device using said second message and transmission/receiving means sends a forth message comprising: Signed(Priv_Base, {E(Pub_Mobile, New_RN1), E(Pub_Mobile, RN1)}) to said first data processing device;
said first data processing device using said first message and transmission/receiving means receives said forth message and sends a fifth message to said second data processing device comprising: Signed(Priv_Mobile, {E(Pub_Base, New_RN2), E(Pub_Base, RN2)});
wherein the value of RN2⊕RN1 is used as the New Key.

31. The apparatus as defined by claim 30 wherein a New Key may be defined:
said first data processing device using said first message and transmission/receiving means sends a forth message to said second data processing device comprising the expression: Signed(Priv_Mobile, {E(Pub_Base, New_RN2), E(Pub_Base, RN2)});
said second data processing device receiving said forth message using said second message and transmission/receiving means and sends a fifth message to said first data processing device comprising the expression: Signed(Priv_Base, {E(Pub_Mobile, New_RN1), E(Pub_Mobile, RN1)});
wherein the value of RN2 if) RN1 is used as the New Key.

32. The apparatus as defined by claim 17 further including a plurality of CAs, and wherein said second message is defined by the expression:
{Cert_Path, List of CRLs, E(Pub_Mobile, RN1), Chosen SKCS, Sig(Priv_Base, {E(Pub_Mobile, RN1), Chosen SKCS, CH1, List of SKCSs})}
and wherein:
CRL comprises a certificate revocation list for each of said CAs.

* * * * *

UNITED STATES PATENT AND TRADEMARK OFFICE
CERTIFICATE OF CORRECTION

PATENT NO. : 5,371,794
DATED : December 6, 1994
INVENTOR(S) : Diffie et al.

It is certified that error appears in the above-identified patent and that said Letters Patent is hereby corrected as shown below:

In column 17, claim 12 at line 37 and column 20, claim 28 at line 4, please delete " E(Pub_Mobile, " and insert -- E(Pub_Mobile, RN1)}}}. --.

In column 20, claim 31 at line 36, please delete " if) " and insert -- ⊕ --.

Signed and Sealed this

Third Day of November, 1998

BRUCE LEHMAN

*Attest:*

*Attesting Officer*              *Commissioner of Patents and Trademarks*